United States Patent [19]
Welsh et al.

[11] Patent Number: 6,105,900
[45] Date of Patent: Aug. 22, 2000

[54] ACTIVE NOISE CONTROL SYSTEM FOR A HELICOPTER GEARBOX MOUNT

[75] Inventors: William A. Welsh, North Haven; Charles A. Yoerkie, Jr., Newington, both of Conn.

[73] Assignee: Sikorsky Aircraft Corporation, Stratford, Conn.

[21] Appl. No.: 08/996,955

[22] Filed: Dec. 23, 1997

[51] Int. Cl.[7] .................................................. B64C 27/00
[52] U.S. Cl. ........................................ 244/1 N; 244/17.27
[58] Field of Search ............................... 244/1 N, 17.11, 244/17.13, 17.27, 54

[56] References Cited

U.S. PATENT DOCUMENTS

| | | |
|---|---|---|
| 2,361,071 | 10/1944 | Vang . |
| 4,562,589 | 12/1985 | Warnaka et al. . |
| 4,715,559 | 12/1987 | Fuller . |
| 4,947,356 | 8/1990 | Elliott et al. . |
| 5,310,137 | 5/1994 | Yoerkie et al. . |
| 5,316,240 | 5/1994 | Girard et al. . |
| 5,423,658 | 6/1995 | Pla et al. . |
| 5,453,943 | 9/1995 | Magliozzi . |
| 5,526,292 | 6/1996 | Hodgson et al. . |
| 5,551,650 | 9/1996 | Southward et al. . |
| 5,732,905 | 3/1998 | Krysinski . |
| 5,789,678 | 8/1998 | Pla . |
| 5,853,144 | 12/1998 | Vincent . |
| 5,895,012 | 4/1999 | Krysinski et al. . |

*Primary Examiner*—Peter M. Poon
*Assistant Examiner*—Tien Dinh
*Attorney, Agent, or Firm*—Adam C. Solomon

[57] ABSTRACT

An active noise control system for a helicopter for minimizing undesirable acoustic noise in a cabin defined by a cabin structure, wherein the undesirable acoustic noise is generated by high frequency structural vibrations emanating from a gearbox, and wherein the gearbox has a plurality of attachment feet structurally coupling the gearbox to the cabin structure at a plurality of structural interfaces. The active noise control system comprises a sensor subsystem disposed in combination with the cabin for sensing the undesirable acoustic noise in the cabin, an actuator subsystem disposed in combination with at least one of the plurality of attachment feet, and a controller functionally interconnecting the sensor subsystem to the actuator subsystem, the controller being operative to receive input from the sensor subsystem and to transmit command signals to the actuator subsystem in response thereto for generating at least one high frequency counter-vibration that is interactive with the high frequency vibrations to minimize the undesirable acoustic noise in the cabin. The active noise control system further includes at least one flange connected to the attachment feet proximal to the corresponding structural interface, and wherein the actuator subsystem further includes at least one structural actuator disposed in combination with the flange.

8 Claims, 8 Drawing Sheets

ACTIVE NOISE CONTROL SYSTEM FOR A HELICOPTER GEARBOX MOUNT

TECHNICAL FIELD

This invention relates generally to active noise control systems, and more particularly, to an active noise control system for a helicopter transmission mount for minimizing undesirable acoustic noise in a helicopter cabin.

BACKGROUND OF THE INVENTION

Interior acoustic noise is a primary concern in the operation of helicopters. While there are numerous sources of acoustic noise-generating vibrations in an operating helicopter, such as the main rotor assembly, the main gearbox, the engines, the tail rotor assembly, the hydraulic system, aerodynamic forces, etc., the high frequency structureborne vibrations emanating from the main gearbox have the most pronounced effect on interior acoustic noise, i.e., in the cockpit and/or cabin.

In a Sikorsky Aircraft Corporation S-92™ helicopter (S-92™ is a trademark of the Sikorsky Aircraft Corporation), the main gearbox includes three stages of reduction gearing: a first stage for each engine output comprising input and output bevel gearing, a second stage comprising two driver bevel pinions driving a main bevel gear, and a final stage comprising a stacked compound planetary gear train having a plurality of primary planetary pinions interacting with a sun gear, and a plurality of secondary planetary pinions interacting with a fixed ring gear (a more detailed description of the operation of the S-92 helicopter's main gearbox can be found in U.S. Pat. No. 5,472,386, STACKED COMPOUND PLANETARY GEAR TRAIN FOR AN UPGRADED POWERTRAIN SYSTEM FOR A HELICOPTER, granted to Kish, and assigned to United Technologies Corporation).

The high frequency vibrations emanating from the main gearbox are coupled to the helicopter airframe structure via main gearbox support members, and induce vibratory responses of many airframe structure natural modes. These vibratory responses excite acoustic natural modes of the cockpit and/or cabin acoustic volume and produce undesirable acoustic noise levels within the helicopter cockpit and/or cabin.

In normal operations, dominant cockpit and/or cabin acoustic noise levels of the S-92 helicopter are primarily the result of high frequency vibrations originating from gear meshing between the secondary planetary pinions and the fixed ring gear in the stacked compound planetary gear train. As illustrated in FIG. 1, the vibrations produced by the first and second reduction stages of the S-92 helicopter's main gearbox, and the vibrations produced by the gear meshing between the primary planetary pinions and the sun gear, occur at very high frequencies 2, 4A, 4B (greater than 1000 Hz), and generate acoustic noise in the cabin and/or cockpit that is minor relative to acoustic noise generated by the gear meshing between the secondary planetary pinions and the fixed ring gear (which occurs at a fundamental frequency 6 of approximately 687.7 Hz at 100% Nr, and can vary between 618.9 Hz at 90% Nr and approximately 722.1 Hz at 105% Nr). Specifically, the high frequency vibrations produced by the gear meshing between the secondary planetary pinions and the fixed ring gear generate acoustic noise in the cabin and/or cockpit that fall into the speech interference range, thereby making them undesirable.

Such acoustic noise generally cannot be effectively abated by passive-type acoustic treatment of the cockpit and/or cabin interior. Passive treatment, such as acoustic panels or blankets, may be partially effective for very high frequency induced acoustic noise, but are not very effective vis-a-vis induced acoustic noise in the 300 to 1000 Hz range. In addition, the weight penalty incurred by the use of such acoustic panels or blankets negatively impacts the performance capability of the helicopter.

Another passive technique involves the use of vibration isolators at the interface between the main rotor assembly/ main gearbox and the airframe structure. Such vibration isolators transmit only a reduced portion of the acoustic noise-generating high frequency vibrations into the helicopter airframe due to their inherent softness. These vibration isolators, however, must be interposed in the primary load path of the helicopter, and gearbox deflections under steady flight loads may cause high speed engine-to-transmission drive shaft deflections that may adversely impact shaft reliability and could also induce false commands into the flight control system.

In U.S. Pat. No. 5,310,137, HELICOPTER ACTIVE NOISE CONTROL SYSTEM, granted to Yoerkie et al., and assigned to United Technologies Corporation (hereinafter "'137 patent"), an active noise control system for a helicopter is disclosed that is operative to effectively nullify one or more high frequency vibrations emanating from a gearbox at a gearbox/airframe interface, thereby significantly reducing the interior noise levels of the helicopter. The active noise control system is design optimized to minimize the number of actuators required, and is design optimized to minimize contamination forces arising from operation of the system actuators. The active noise control system includes modified transmission beams that are mechanically stiffened to function as rigid bodies with respect to the one or more of the high frequency vibrations, a plurality of actuators disposed in combination with the modified transmission beams, a plurality of sensors disposed in combination with the modified transmission beams in a collinear, spaced apart functional correlation with respective actuators, and controllers interconnecting individual actuators with respective functionally correlated sensors.

A drawback to the active noise control system disclosed in the '137 patent is that although the placement of the actuators and sensors on the transmission beams results in localized nullification of high frequency vibrations at the sensor locations, the location of the sensors and actuators remotely from the gearbox/airframe interface may permit the "leaking" of high frequency vibrations into the helicopter's airframe through the space between the gearbox/ airframe interface and the sensor locations. Therefore, although the sensors may return data to the controller indicative of nullified high frequency vibrations, there still exists a possibility that undesirable acoustic noise is being generated in the cabin.

DISCLOSURE OF THE INVENTION

It is therefore an object of the present invention to provide an active noise control system for a helicopter that effectively minimizes undesirable acoustic noise in the helicopter's cabin.

These objects and others are achieved in the present invention by an active noise control system for a helicopter for minimizing undesirable acoustic noise in a cabin defined by a cabin structure, wherein the undesirable acoustic noise is generated by high frequency structural vibrations emanating from a gearbox, and wherein the gearbox has a plurality of attachment feet structurally coupling the gearbox to the cabin structure at a plurality of structural interfaces.

The active noise control system comprises a sensor subsystem disposed in combination with the cabin for sensing the undesirable acoustic noise in the cabin, an actuator subsystem disposed in combination with at least one of the plurality of attachment feet, and a controller functionally interconnecting the sensor subsystem to the actuator subsystem, the controller being operative to receive input from the sensor subsystem and to transmit command signals to the actuator subsystem in response thereto for generating at least one high frequency counter-vibration that is interactive with the high frequency vibrations to minimize the undesirable acoustic noise in the cabin.

Still other objects and advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BEST MODE FOR CARRYING OUT THE INVENTION

Figure 2:
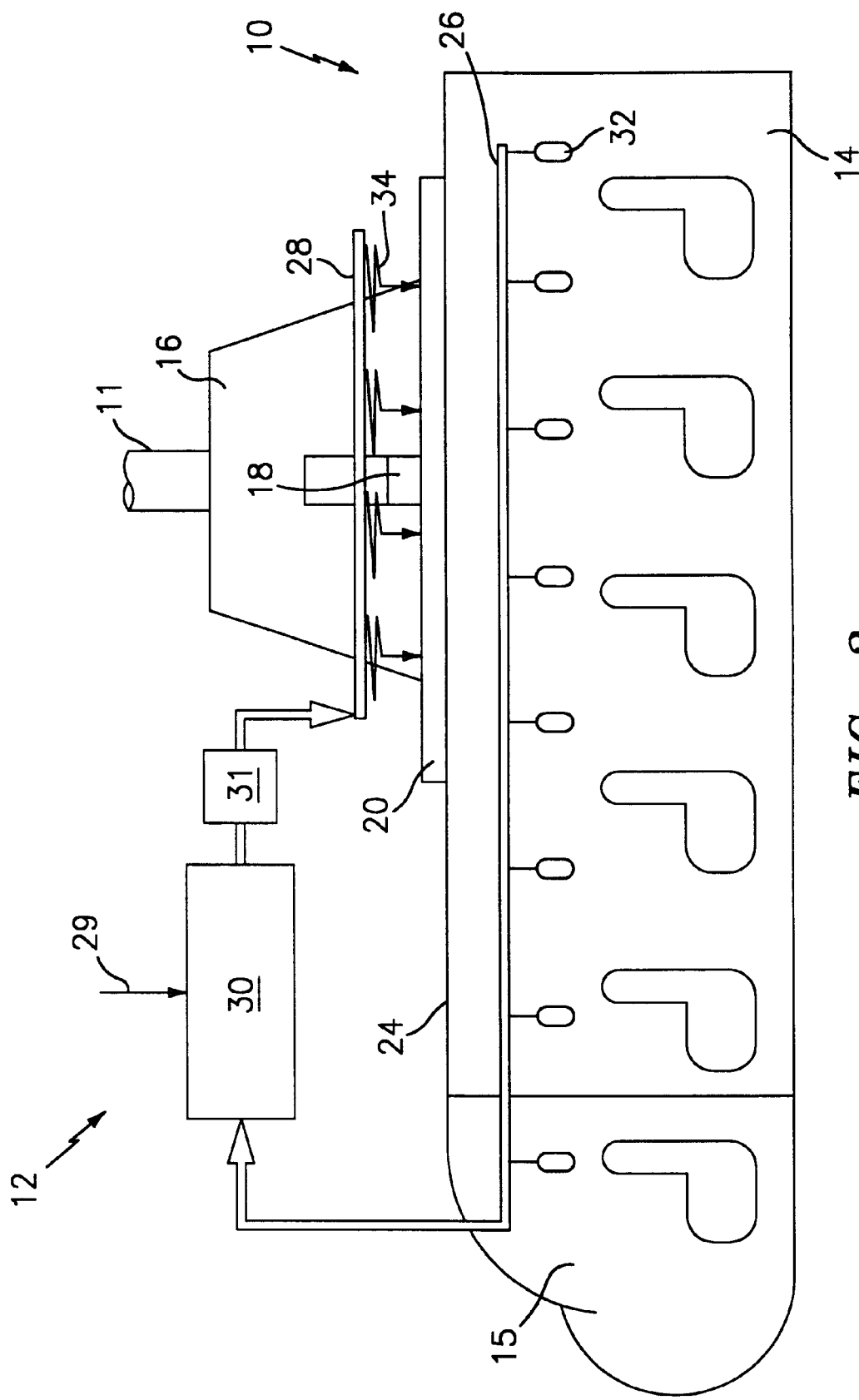
FIG. 2 is a schematic view of a helicopter having an active noise control system embodying features of the present invention.

Referring now to the drawings wherein like reference characters identify corresponding or similar elements throughout the several views, FIG. 2 is a schematic illustration of a Sikorsky Aircraft Corporation S-92™ helicopter 10 (S-92™ is a trademark of the Sikorsky Aircraft Corporation) having an active noise control system 12 embodying features of the present invention, for minimizing undesirable acoustic noise in the cabin 14 of the helicopter 10. As used herein, the cabin 14 can also include the cockpit 15 of the helicopter 10 and other interior compartments (not shown).

Figure 3:
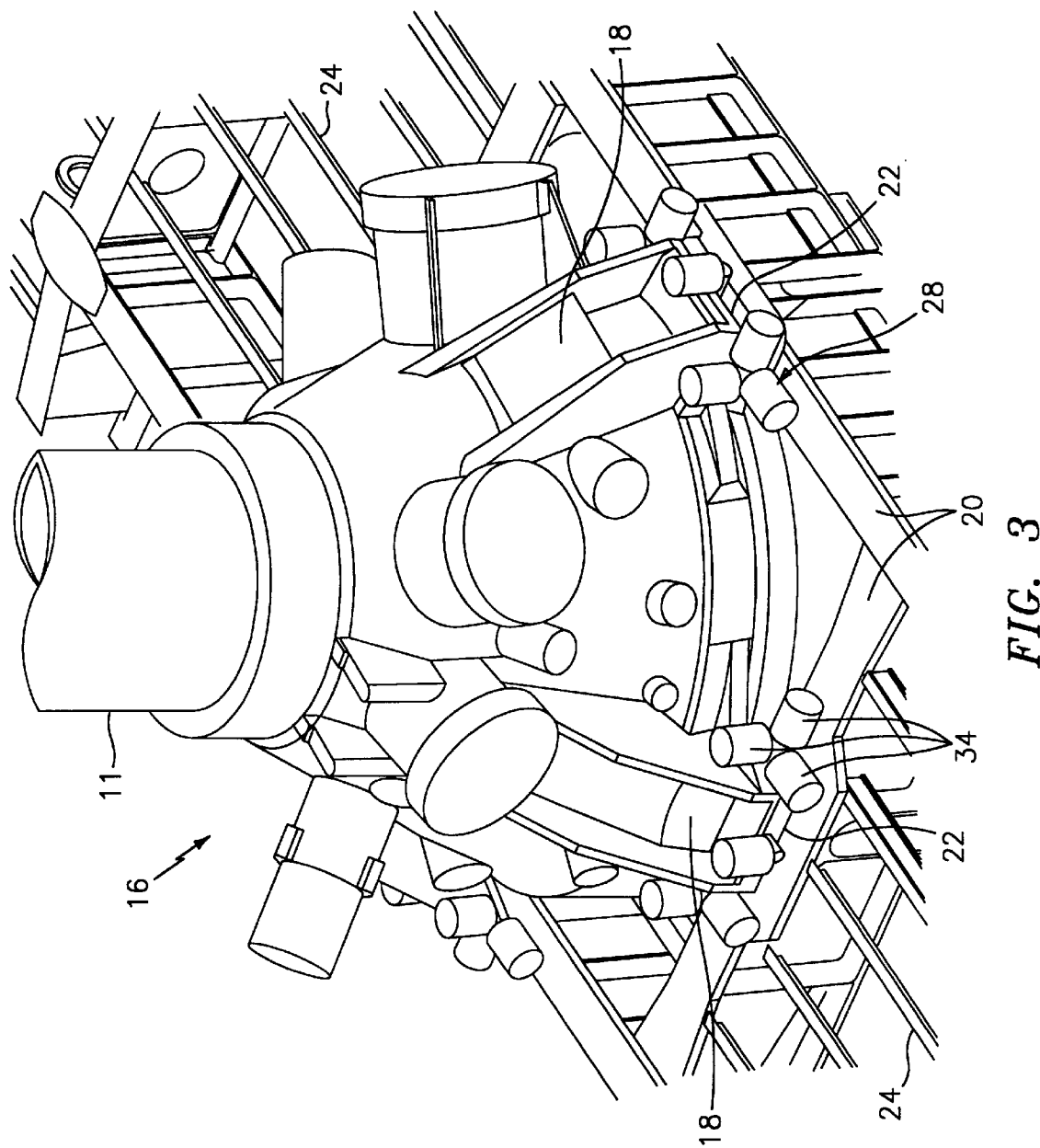
FIG. 3 is a perspective view of an S-92 helicopter main gearbox illustrating elements of the active noise control system of FIG. 2.

FIG. 3 depicts a main gearbox 16 for the S-92 helicopter 10. As is known in the art, the main gearbox 16 mechanically couples the turbine engines (not shown) to the main rotor drive shaft 11 and tail rotor drive shaft (not shown) of the helicopter 10, and functions to transmit torque from the turbine engines to the respective drive shafts. The main gearbox 16 includes a plurality of attachment feet 18 for securing the main gearbox 16 to a plurality of main gearbox support members 20, thereby defining a plurality of structural interfaces 22 at the securing locations. Referring to FIGS. 2 and 3, the plurality of main gearbox support members 20 are in turn structurally coupled to a cabin structure 24 that defines the cabin 14.

The active noise control system 12 comprises a sensor subsystem 26 disposed in combination with the cabin 14, an actuator subsystem 28 disposed proximal to the structural interfaces 22, and a controller 30 functionally interconnecting the sensor subsystem 26 to the actuator subsystem 28.

In the described embodiment, the sensor subsystem 26 comprises a plurality of conventional microphones 32 disposed within the cabin 14. It will be appreciated that the number of microphones 32 and their locations will vary depending on a number of factors, including the extent of global acoustic noise reduction desired in the cabin 14, the costs associated with deploying a specific number of microphones 32, and the computing power necessary and/or available to process the signals generated by a selected number of microphones 32.

Figure 2A:
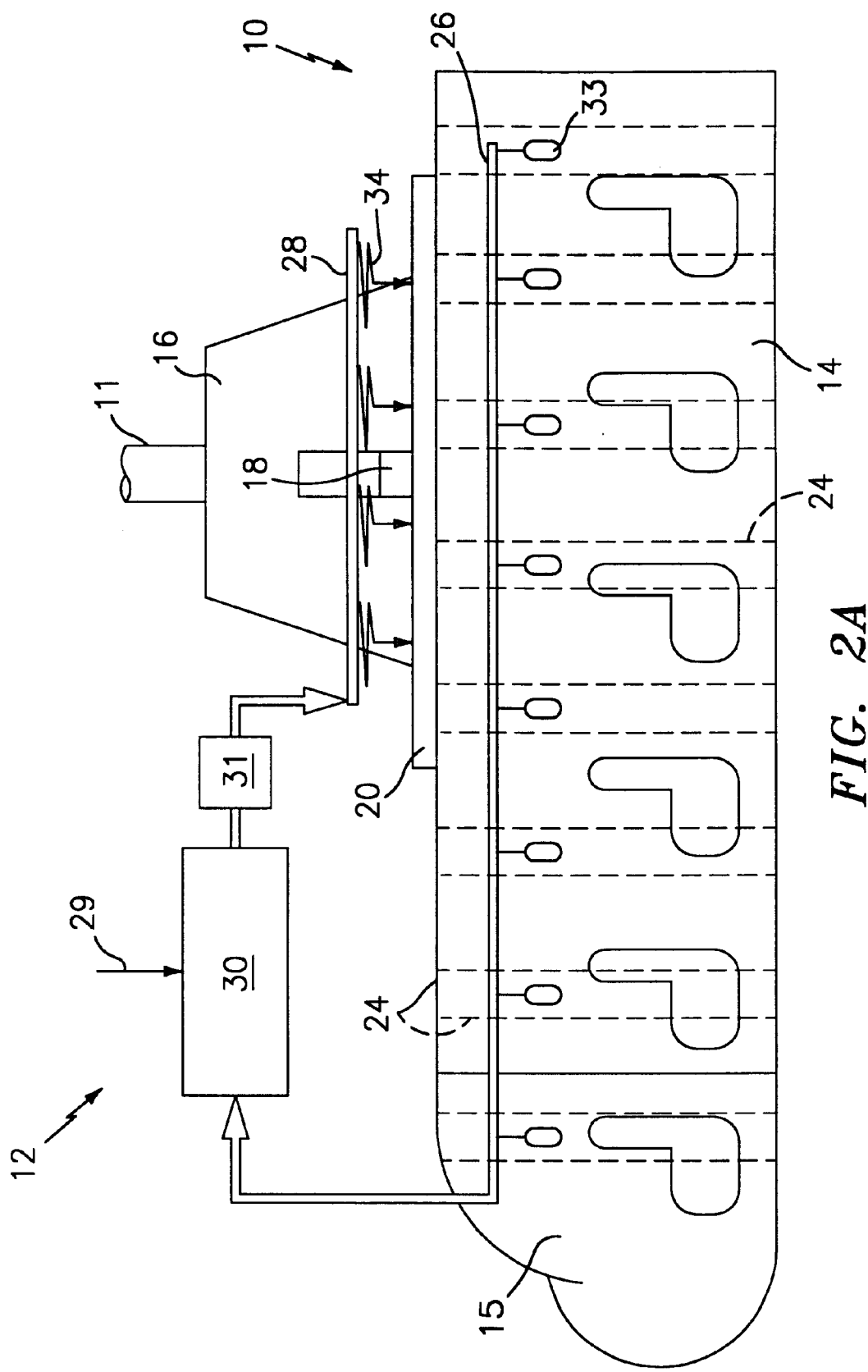
FIG. 2A is a schematic view of a helicopter having an alternative embodiment of the active noise control system of FIG. 2.

In an alternative embodiment, as depicted in FIG. 2A, the sensor subsystem 26 can comprise a plurality of conventional accelerometers 33 disposed in combination with the cabin structure 24.

Figure 6:
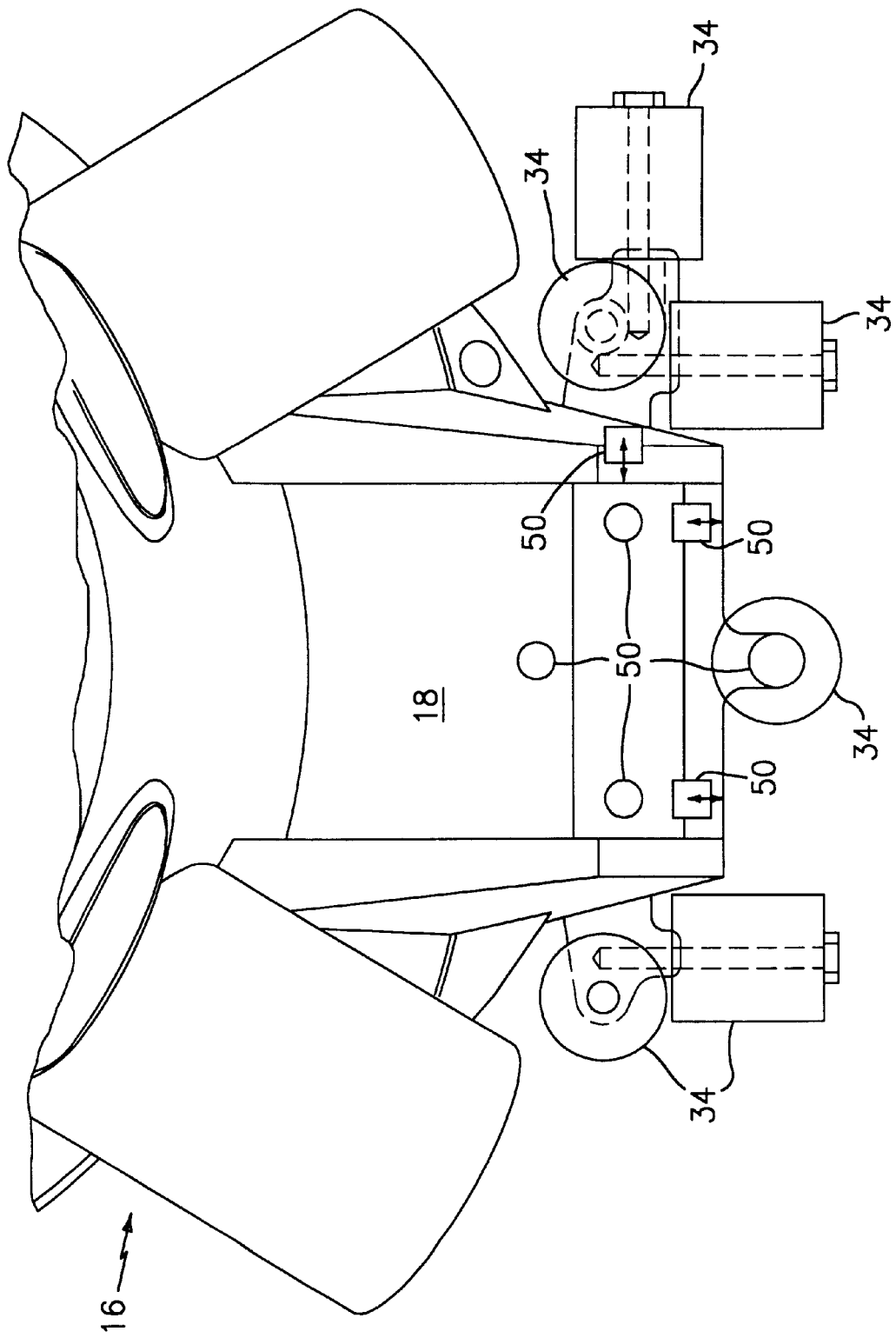
FIG. 6 is a top view, partly broken away, of the main gearbox of FIG. 3, illustrating one embodiment of elements the active noise control system of FIG. 2.

Referring to FIG. 6, in another alternative embodiment, the sensor subsystem 26 comprises a plurality of accelerometers 50 disposed in combination with the attachment feet 18 of the main transmission gearbox 16. In the embodiment depicted in FIG. 6, the plurality of accelerometers 50 are functionally oriented along orthogonal axes to provide vibratory sensor information along these axes. It will be appreciated that the number of accelerometers, and their orientations, can be optimized for each application to effectively minimize the transmission of high frequency vibrations into the cabin 14.

Figure 7:
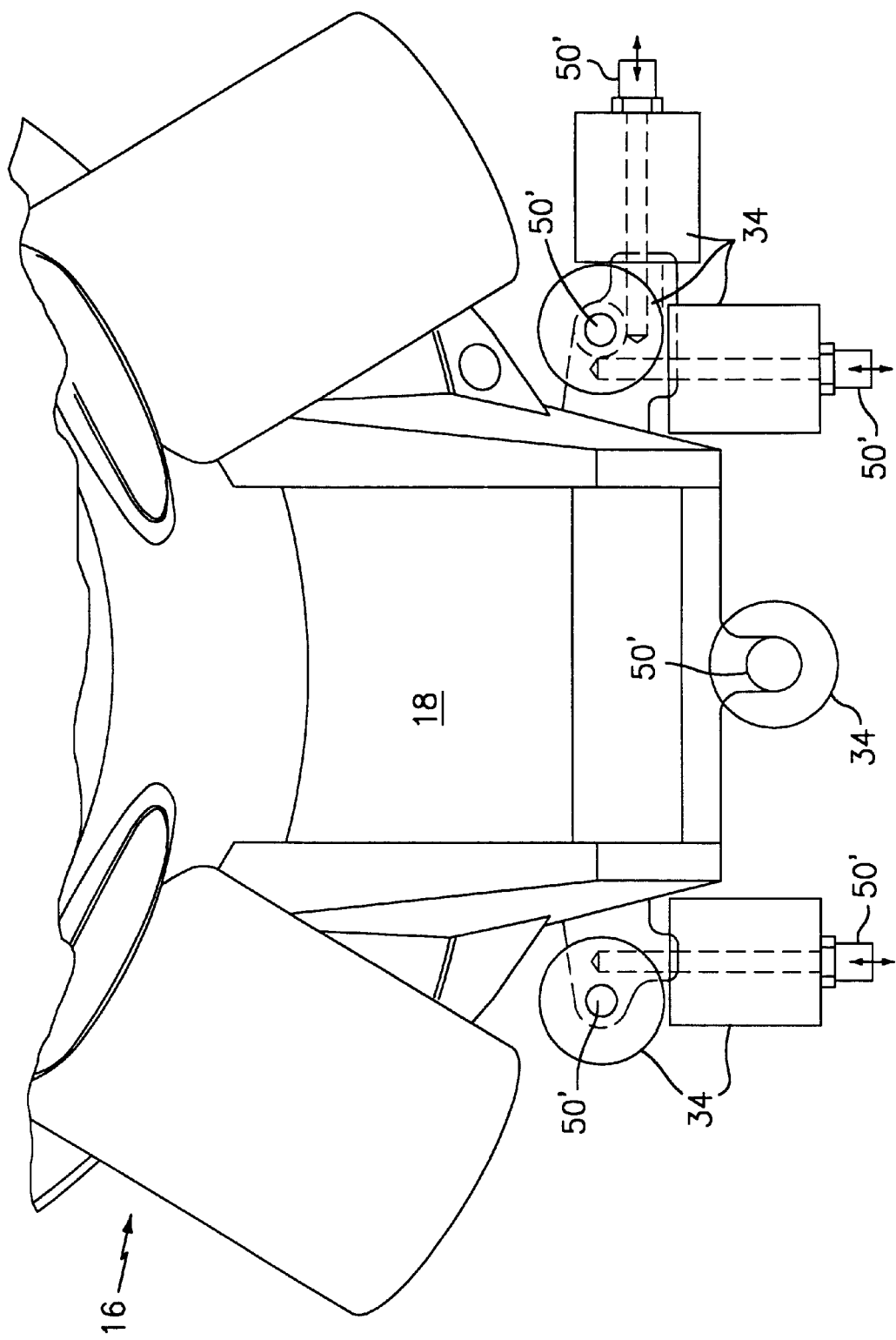
FIG. 7 is a top view, partly broken away, of the main gearbox of FIG. 3, depicting an alternative embodiment of elements of the active noise control system of FIG. 2.

Referring to FIG. 7, in yet another alternative embodiment, the sensor subsystem 26 comprises a plurality of accelerometers 50' disposed in combination with a plurality of actuators 34. In the embodiment depicted in FIG. 7, each of the plurality of accelerometers 50' is disposed in a collinear, spaced apart, functional correlation with respect to the functionally correlated actuator 34.

In other alternative embodiments, the sensor subsystem 26 can comprise a plurality of accelerometers disposed in combination with the attachment feet 18 and the plurality of actuators 34. In still other alternative embodiments, the sensor subsystem 26 can comprise a combination of microphones disposed within the cabin 14, and accelerometers disposed in combination with the attachment feet 18, actuators 34, or a combination thereof.

Figure 4:
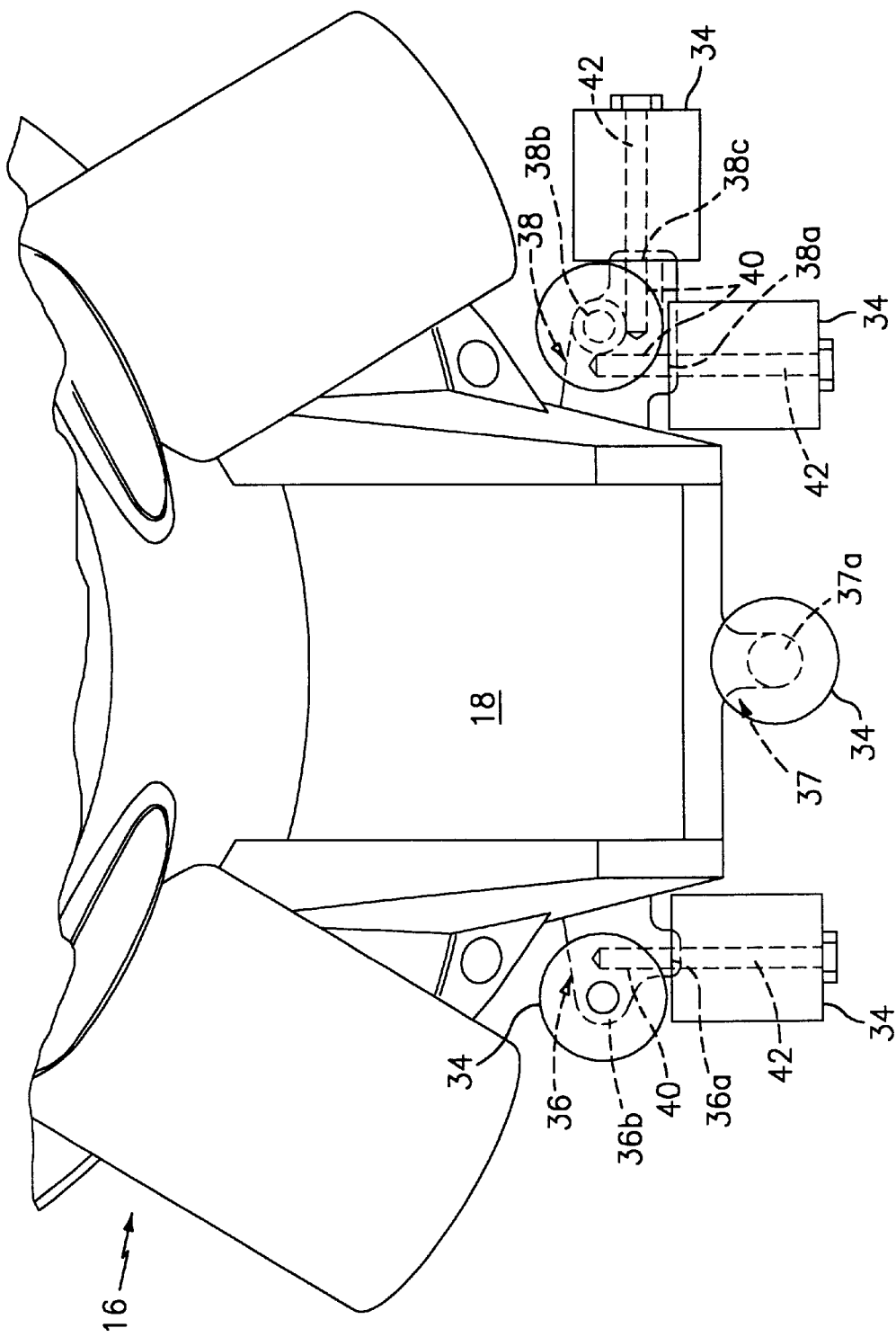
FIG. 4 is a top view, partly broken away, of the main gearbox of FIG. 3.
Figure 5:
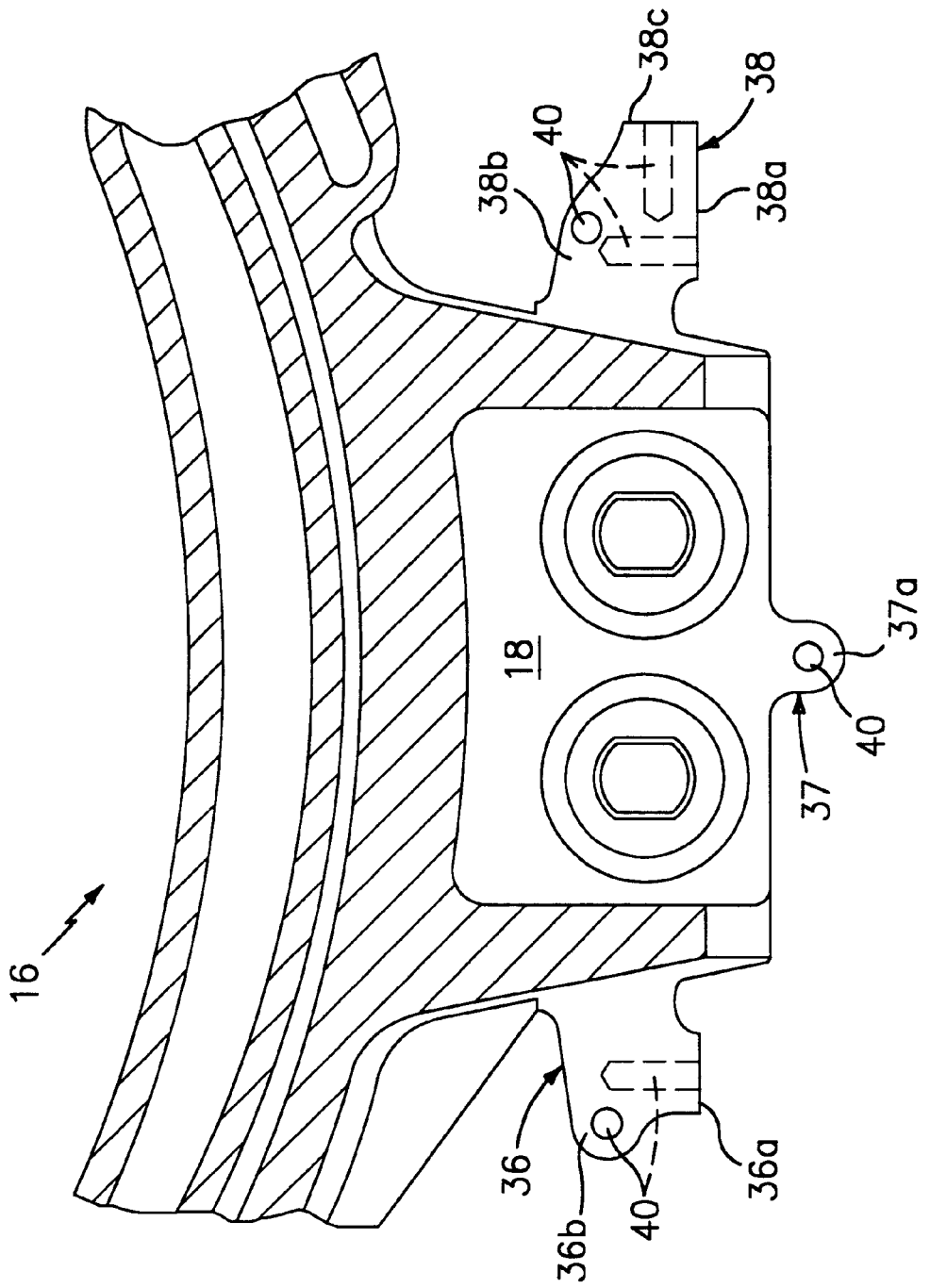
FIG. 5 is a top view, partly broken away, of the main gearbox of FIG. 3, with elements of the active noise control system removed for visual clarity.

Referring to FIGS. 2–5, the described embodiment of the actuator subsystem 28 comprises a plurality of inertial mass actuators 34 disposed in combination with the attachment feet 18 of the main gearbox 16. Each of the attachment feet 18 includes a plurality of flanges 36, 37, 38 extending therefrom, wherein the plurality of flanges 36, 37, 38 are spaced proximal to the structural interfaces 22, and wherein each of the flanges 36, 37, 38 is configured to receive at least one actuator 34. Specifically, as illustrated in FIGS. 4 and 5, the flange 36 includes two mating surfaces 36a, 36b, wherein each mating surface 36a, 36b has a threaded bore 40 formed therein perpendicular to the plane of the mating surface 36a, 36b, and wherein the threaded bores 40 are configured to receive threaded bolts 42 that extend through the actuators 34. In the flange 36, the mating surfaces 36a, 36b are oriented such that when the threaded bolts 42 are fastened into the threaded bores 40, the actuators 34 are aligned along perpendicular axes. In the described embodiment, flange 37 includes one mating surface 37a, and flange 38 includes three mating surfaces 38a, 38b, 38c that provide for mounting of the actuators 34 along mutually perpendicular axes. The cumulative effect of this embodiment is that the actuators 34 mounted on the various flanges 36, 37, 38 are aligned along parallel and perpendicular axes.

In alternative embodiments, the respective mating surfaces of the flanges 36, 37, 38 may be configured/oriented such that the actuators 34 are mounted along non-parallel and/or non-perpendicular axes.

As will be appreciated by those skilled in the art, the number and orientation of the actuators 34 in combination with the flanges 36, 37, 38 dictate the type and direction of forces and/or moments (i.e., degrees of freedom) the actuators 34 generate at each of the structural interfaces 22. Therefore, in alternative embodiments, the number and orientation of the actuators 34 and flanges 36, 37, 38 can differ from those of the described embodiment, to conform with operational requirements for a particular application. It will also be appreciated that although in the described environment, the inertial mass actuators 34 are fastened to the mating surfaces 36a, 36b, 37a, 38a, 38b, 38c with threaded bolts 42, in alternative embodiments, other conventional actuators can be disposed proximal to the structural interfaces 22, using conventional mounting techniques, to generate high frequency counter-vibrations for use in minimizing undesirable acoustic noise in the cabin 14.

In the described embodiment, the controller 30 is of a conventional type for receiving input signals from the microphones 32 and for transmitting command signals to the actuators 34 in response thereto in accordance with the programming of the controller 30. In the described embodiment, an electrical amplifier 31 is interposed between the controller 30 and the actuators 34 to amplify the command signals transmitted to the actuators 34.

Figure 1:
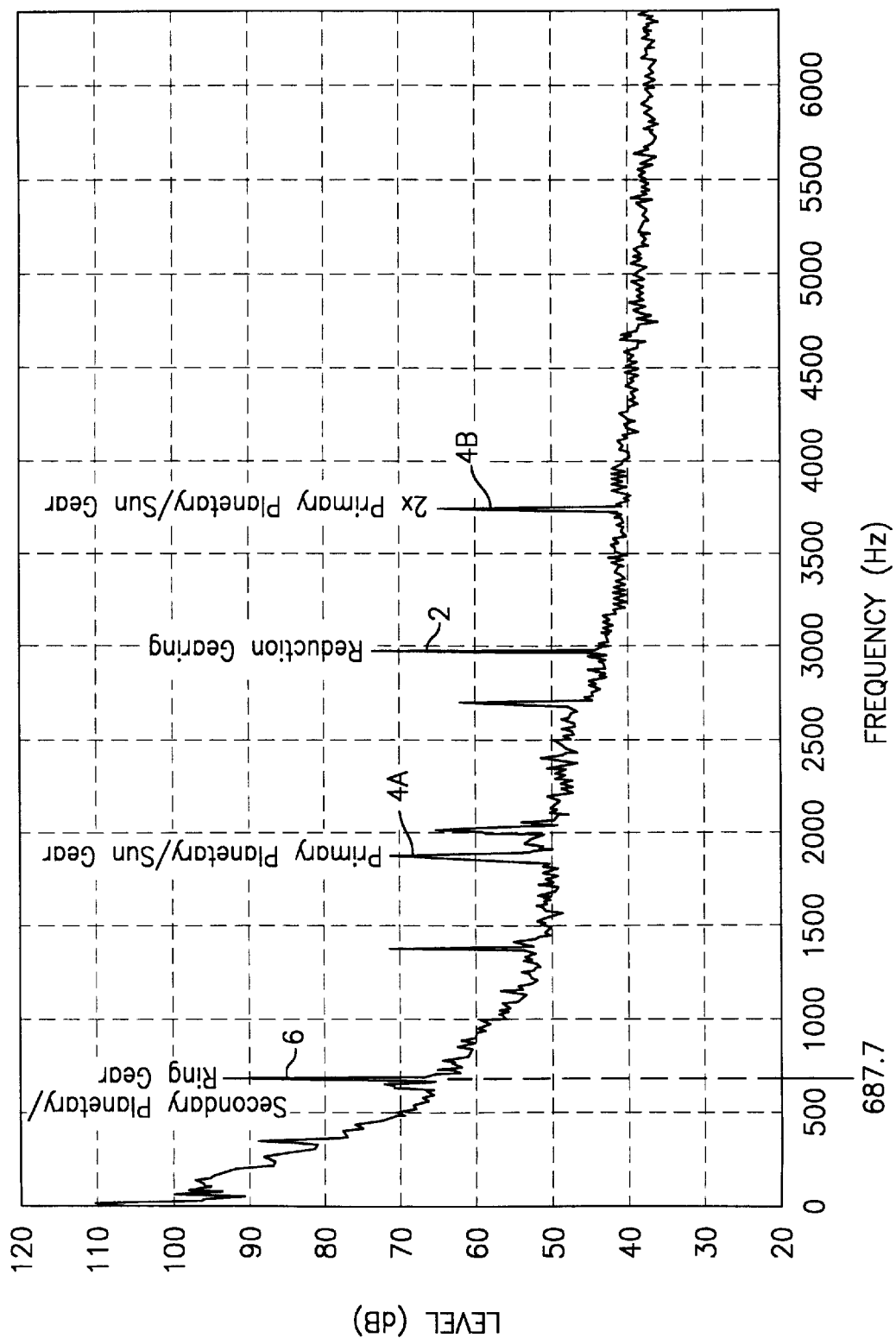
FIG. 1 is a graph illustrating a frequency spectra of vibrations generated by a Sikorsky Aircraft Corporation S-92 helicopter.

Referring to FIGS. 1 and 2, during operation of the helicopter 10, the main gearbox 16 generates high frequency vibrations that are transmitted from the attachment feet 18 to the plurality of main gearbox support members 20 through the structural interfaces 22, and are then transmitted from the main gearbox support members 20 to the cabin structure 24 and then into the cabin 14 as acoustic noise. In the described embodiment for the S-92 helicopter 10, the high frequency vibrations generated by the main gearbox 16 from gear meshing between the secondary planetary pinions (not shown) and the fixed ring gear (not shown) at a fundamental frequency of approximately 687.7 Hz at 100% Nr (identified in FIG. 1 as 6), produce undesirable acoustic noise when transmitted into the cabin 14. Therefore, in the described embodiment, the active noise control system 12 is optimized to minimize high frequency structural vibrations generated by the main gearbox 16 at a frequency range of approximately 618.9 Hz at 90% Nr to approximately 722.1 Hz at 105% Nr, thereby minimizing acoustic noise in the cabin 14 between those frequencies. However, in alternative embodiments, the active noise control system 12 can be optimized to minimize high frequency structural vibrations and acoustic noise at other frequencies, or combinations of frequencies, as dictated by the operational characteristics of a particular helicopter or other application.

Referring to FIGS. 2–5, in operation, the undesirable acoustic noise generated in the cabin 14 by the high frequency structural vibrations are detected by the microphones 32, which in turn deliver signals to the controller 30 indicative of the frequency and magnitude of the undesirable acoustic noise. The controller 30 filters the signals received from the microphones 32 to isolate the frequency or frequencies targeted for minimization (i.e., the undesirable acoustic noise frequencies). Concurrent with the input of the signals from the microphones 32 to the controller 30, the controller 30 receives input 29 from a tachometer (not shown) disposed in combination with a rotating gear (not shown) within the main gearbox 16, to establish a reference phase for the active noise control system 12. Then, using a conventional minimum variance control algorithm in combination with the signals received from the microphones 32 and the tachometer, the controller 30 delivers command signals through the electrical amplifier 31 to each of the plurality of actuators 34 to generate high frequency structural counter-vibrations proximal to the structural interfaces 22. These high frequency structural counter-vibrations are optimized by the controller 30 with magnitudes, frequencies, and phases to interact with the high frequency structural vibrations to minimize transmission of the high frequency structural vibrations through the structural interfaces 22, thereby minimizing the undesirable acoustic noise in the cabin 14.

Although the described embodiment of the active noise control system 12 is disposed in combination with the gearbox 16 and cabin 14 of a helicopter 10, in alternative embodiments, the present invention can be disposed in combination with any defined volume structurally coupled to a vibration source (e.g., a helicopter cabin and tail gearbox, an automobile interior and engine). In addition, in alternative embodiments, the defined volume does not have to be fully enclosed, and can comprise any volume at least partially defined by a structure or multiple structures.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. An active noise control system for a helicopter for minimizing undesirable acoustic noise in a cabin defined by a cabin structure, the undesirable acoustic noise being generated by high frequency structural vibrations emanating from a gearbox, the gearbox having a plurality of attachment feet structurally coupling the gearbox to the cabin structure at a plurality of structural interfaces, the active noise control system comprising:

a sensor subsystem disposed in combination with the cabin for sensing the undesirable acoustic noise in the cabin;

at least one actuator subsystem mounted to an associated one of the plurality of attachment feet; and a controller functionally interconnecting said sensor subsystem to said actuator subsystem, said controller being operative to receive input from said sensor subsystem and to transmit command signals to said actuator subsystem in response thereto for generating at least one high frequency counter-vibration that is interactive with the high frequency vibrations to minimize the undesirable acoustic noise in the cabin, wherein (a) at least one of the plurality of attachment feet includes at least one flange connected thereto, each said flange forming a portion of a corresponding structural interface; and (b) wherein the actuator subsystem comprises at least one structural actuator mounted to an associated flange.

2. The active noise control system of claim 1, wherein said sensor subsystem comprises a plurality of microphones disposed within the cabin.

3. The active noise control system of claim 1 wherein each of the plurality of attachment feet includes three flanges.

4. The active noise control system of claim 1 wherein each flange includes at least one bore for providing a means to mount the at least one actuator subsystem to an associated one of the plurality of attachment feet.

5. The active noise control system of claim 1 wherein the structural actuators are aligned along parallel and perpendicular axes.

6. An active noise control system for a helicopter for minimizing undesirable acoustic noise in a cabin defined by a cabin structure, the undesirable acoustic noise being generated by high frequency vibrations emanating from a gearbox, the gearbox having a plurality of attachment feet structurally coupling the gearbox to the cabin structure at a plurality of structural interfaces, the active noise control system comprising:

a sensor subsystem disposed in combination with the gearbox for sensing the high frequency vibrations emanating from the gearbox;

at least one actuator subsystem mounted to an associated one of the plurality of attachment feet; and a controller functionally interconnecting said sensor subsystem to said actuator subsystem, said controller being operative to receive input from said sensor subsystem and to transmit command signals to said actuator subsystem for generating at least one high frequency counter-vibration that is interactive with the high frequency vibrations to minimize the undesirable acoustic noise in the cabin, wherein (a) at least one of the plurality of attachment feet includes at least one flange connected thereto, each said flange forming a portion of a corresponding structural interface; and (b) the actuator subsystem comprises at least one structural actuator mounted to a flange.

7. The active noise control system of claim 6, wherein said sensor subsystem comprises at least one accelerometer mounted to at least one of the plurality of attachment feet.

8. The active noise control system of claim 6, wherein said sensor subsystem comprises at least one accelerometer mounted to at least one structural actuator.

* * * * *